(12) United States Patent
Stoinski et al.

(10) Patent No.: US 9,140,298 B2
(45) Date of Patent: Sep. 22, 2015

(54) SEGMENTED VISCOELASTIC BUSHING FOR ROTATING ELECTRICAL MACHINES BEARING (75) Inventors: Valmir Luis Stoinski, Jaragua do Sul (BR); Rui Paulo Weis, Jaragua do Sul (BR)

(73) Assignee: WEG EQUIPAMENTOS ELETRICOS S.A. - MOTORES, Jaragua do Sul (BR)

(*) Notice: Subject to any disclaimer, the term of this patent is extended or adjusted under 35 U.S.C. 154(b) by 0 days.

(21) Appl. No.: 14/115,611

(22) PCT Filed: Dec. 31, 2011

(86) PCT No.: PCT/BR2011/000473
§ 371 (c)(1),
(2), (4) Date: Nov. 4, 2013

(87) PCT Pub. No.: WO2013/086589
PCT Pub. Date: Jun. 20, 2013

(65) Prior Publication Data
US 2015/0016763 A1 Jan. 15, 2015

(51) Int. Cl.
*F16C 27/04* (2006.01)
*F16C 27/06* (2006.01)
*F16C 35/077* (2006.01)
*F16C 19/16* (2006.01)
*F16C 19/52* (2006.01)

(52) U.S. Cl.
CPC ............... *F16C 27/066* (2013.01); *F16C 19/16* (2013.01); *F16C 19/525* (2013.01); *F16C 19/527* (2013.01); *F16C 27/06* (2013.01); *F16C 35/077* (2013.01)

(58) Field of Classification Search
CPC ..... F16C 27/066; F16C 19/525; F16C 19/527
See application file for complete search history.

(56) References Cited

U.S. PATENT DOCUMENTS

| | | | | |
|---|---|---|---|---|
| 2,504,776 A * | 4/1950 | Woodfield et al. | ............ | 384/535 |
| 2,506,404 A * | 5/1950 | Morton et al. | ................ | 384/535 |
| 5,044,785 A * | 9/1991 | Bair et al. | ...................... | 384/536 |
| 6,030,128 A * | 2/2000 | Pontzer | ....................... | 384/476 |
| 6,318,900 B1 * | 11/2001 | Bere et al. | ..................... | 384/535 |
| 8,267,592 B2 * | 9/2012 | Godleski | ....................... | 384/558 |

* cited by examiner

*Primary Examiner* — Thomas R. Hannon
(74) *Attorney, Agent, or Firm* — Stites & Harbison PLLC; Mandy Wilson Decker (57) ABSTRACT

The segmented viscoelastic bushing for rating electrical machines bearing is disclosed herein, and is designed to absorb radial and axial expansion variations during the rotating electrical machine operation. The bushing is configured to be housed between the bearing and the wheel hub in order to absorb impacts, while allowing for a controlled level of axial and radial movement of the bearing resulting from the existing clearance between the bearing and the outer ring of the bearing.

15 Claims, 8 Drawing Sheets

SEGMENTED VISCOELASTIC BUSHING FOR ROTATING ELECTRICAL MACHINES BEARING

TECHNICAL FIELD

The present invention discloses a segmented viscoelastic device bushing for rotating electrical machines bearing which is configured to be inserted between wheel hub and the bearing in such a way to eliminate the need for conventional machining to reduce noises and vibrations in bearing hubs for motors and generators, which currently requires high dimensional accuracy.

BACKGROUND OF THE INVENTION

In general, the drawbacks resulting from the frictional resistance to high-speed of the sliding bearings led to the development of roller bearings. Roller bearings are composed of a pair of steel rings (rails) separated by one or more rows of balls or rollers (rolling bodies), which eliminate the sliding friction. The balls are kept equidistant to each other through a cage to distribute forces and maintain concentricity of the rings, the outer ring is fixed to the wheel hub and the inner ring is attached directly to the axis, or shaft. The bearings can interact with two types of loads: radial and axial. The radial force is that extending or moving from a central point outwardly and the axial force is that extending or dissipating through the central axis.

The roller bearing housing in the hub cavity requires machining processes of high dimensional accuracy so that the bearing does not move radially inside the cavity. For this reason, the dimensional variation is usually determined by the bearing supplier. However, the conventional processes for obtaining the bearing hub do not ensure the dimensional repeatability required by the system without further accuracy finishing, typically grinding, resulting in difficulty of assembly or excessive clearance of the bearing in the hub. In this case the outer track of the bearing rotates within the cavity with a high possibility of noises and wear, reducing the lifetime of the product.

Typically, in a construction of single-phase or three-phase induction motors with squirrel cage rotor, the air gap value should be sized according to the machine design and a series of combined data. A text, published in 1936, states that " . . . it is necessary (to lower the magnetizing current) using a small air gap (but not too small) . . . . The [clearance] must be chosen such that the excitation current and reactance of the machine are in accordance with the desired performance. Reduced gaps can increase motor noise and losses in the tooth face . . . "

The existing variations in the air gap will depend on the slit dimensions, stator and configuration of the winding. In any case, an air gap variation up to 20% does not result in a significant change in the performance of the locked rotor, a fundamental aspect of a motor's performance.

In commercial ventilation applications utilizing fractional horsepower motors, i.e., with powers lower than 1 cv, the radial loads are usually proportionally small when compared to the mechanic resistance of the viscoelastic bearing. In these conditions, the bearing barely touches the seat of the wheel hub in normal application, maintained only by the elastic action of the viscoelastic bushing, which causes the assembly to operate advantageously in relation to the noise. Usually, it is desired that the noise is low in this type of application when compared to others conventional applications of rotating electrical machines. In this application, we typically find air gap values between 0.2 to 0.35 mm in products normally commercialized.

In particular, applications in rotating electrical machines require accuracy and alignment of the assembly. The wheel hubs of roller bearings are usually machined because standards require controlled values for durability, noise, and vibration.

DESCRIPTION OF THE STATE OF THE ART

In the state of the art, there are devices aiming to compensate for the differential between bearings and hub resulting from the thermal expansion between components. For example, in the case of using aluminum bearing, where it is known that the aluminum expansion is close to three-times that of steel, tolerance rings or shells are used as intermediate components. In other cases of heavy applications and high temperature, in order to avoid the expansions that cause the components to latch, non-segmented bushings are used, manufactured from rubber. In this case, the main drawback of these devices is that they do not meet the concentricity requirement when exposed to radial tensions.

U.S. Pat. No. 2,886,354 discloses a bushing, with a wavy ring shape with spikes extending axially, so the undesired radial pressure is distributed between the spikes corners, in order to eliminate friction, increasing the contact pressure between bearing and wheel hub, built in a type of "spring" steel by stamping.

U.S. Pat. No. 3,061,386 discloses a tolerance sleeve manufactured from metal sheets, comprising corrugations formed in the center portion of a cylindrical split sleeve wherein the individual corrugations cooperatively define an overall sinusoidal configuration.

U.S. Pat. No. 3,033,622 discloses a set comprising a bushing for interposition between two pieces such as a shaft and the inner race of a ball bearing having a polygonal shaped spring to absorb excessive radial pressures. The drawback to this patent is the requirement of the spring to be fitted through a screwed disc to the wheel hub, increasing severely the manufacturing costs of the mounted system.

The patent GB723399 discloses an elastic device, manufactured from rubber or silicon rubber in a U-shape or ring shape. The device is compressed when inserted between a ring and a cavity wall, to compensate for axial variations.

U.S. Pat. No. 7,452,135 discloses a bearing support comprised of a serial set of annular plates stacked in cone shape between the housing wall and the outer race of the bearing ring. Annular plates can be formed from a single wire formed in a coil, or from a plurality of annular cones stacked in series, to allow radial dimensional variations and provide a spring rate.

U.S. Pat. No. 4,699,528 describes an assembly including a shaft and a bearing interposed between the shaft and its housing to provide radial support and relative rotation to absorb radial and axial variations. However, the assembly comprises a series of combined elements and a specific bearing, mounted in the machine itself which targets more severe applications with high temperatures, presenting high complexity and increasing the production costs.

U.S. Pat. No. 5,611,628 describes a bearing sleeve positioned around a rotating shaft, comprising alternating peaks and valleys on its surface, used to compensate for radial or axial variations.

U.S. Pat. No. 4,486,055 discloses a device for compensating for radial variations or play, comprising a disc having a wedge shaped rim. This system consists of a separator ring between the bearing and the bore of an axially pre-tensioned spring loaded ball bearing assembly, where the ring is shaped to prevent radial play between the bearing assembly and the bore. A drawback of the device is the machining need of the inner diameter of the wheel hub, due to the sliding that is required of the separator ring.

U.S. Pat. No. 2,926,051 discloses a resilient bearing mounting with a sleeve whose inner diameter is larger than the outer diameter and an axial pre-tension spring.

The document FR2839396 discloses a ring having a L-shaped profile produced from an elastic material to provide damping that has an axial dimension longer than one and a half times the bearing width, which causes a lot of dimensional disturbances. Particularly in this case the manufacturing dimensional accuracy is identical to a rigid system.

U.S. Pat. No. 7,223,020 discloses bearing assembly having an outer ring and an inner ring. The outer ring of the bearing is axially fitted in a recess of an inner cylindrical wall. A radially flexible element is located between at least one of the outer rings from the bearing and inner wall of the recess, and the inner ring of the bearing and a rotating member that is rotatably carried in the bearing assembly.

From the above, it is clear that systems for absorbing axial and radial deformations, variations, or play, are known in the prior art. However, there is no device in the stated of the art that simultaneously compensated for radial and axial dimensional variations generated between the bearing and the cavity wall that houses it, that eliminates the need for machining the bearing hub, and is associated with a simplified, cost-reduced, production process, either in obtaining the bearing hub or the radial clearances compensator device proposed herein.

OBJECT OF THE INVENTION

Thus, it is the object of the present invention to overcome the drawbacks found in the prior art, by providing a segmented viscoelastic material bushing mounted between a hub and bearing, eliminating machining steps, so that undesirable axial and radial variations are compensated for without damage to the smooth operation of the system.

The present invention discloses a bushing designed to absorb radial and axial expansion variations during electrical machine operation and the clearances obtained from the high-pressure injection process of the wheel hub without requiring any subsequent machining or precision finishing of the wheel hub. The bushing is fitted between the bearing and the wheel hub in order to dampen impacts, while allowing controlled the radial and axial movement of the bearing resulting from the existing clearance between the bearing and the outer ring of the bearing, at up to 30% of the air gap. Thus, the present invention aims to avoid the shaft/bearing assembly remaining loose in the cavity, through the use of elastic pressure, thereby avoiding rotational movements in which the bearing can rub against the wheel hub causing wear, increase in temperature, and undesirable noises and vibrations. This is possible, obtaining the electrical machine bearing through a high-pressure casting process that will provide suitable accuracy for concentricity and finishing for the proposed application.

DETAILED DESCRIPTION OF FIGURES

Figure 1:
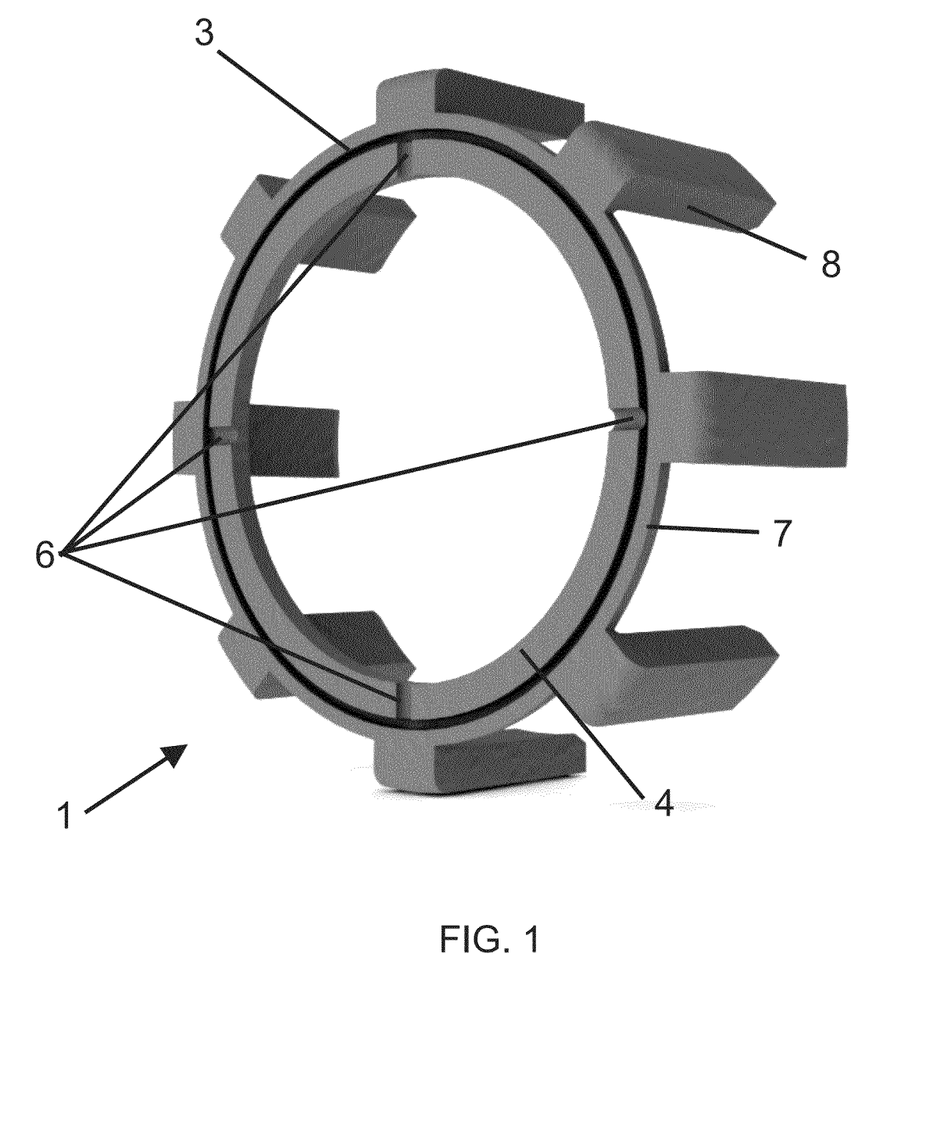
FIG. 1 illustrates a rear view of the segmented viscoelastic bushing.
Figure 2:
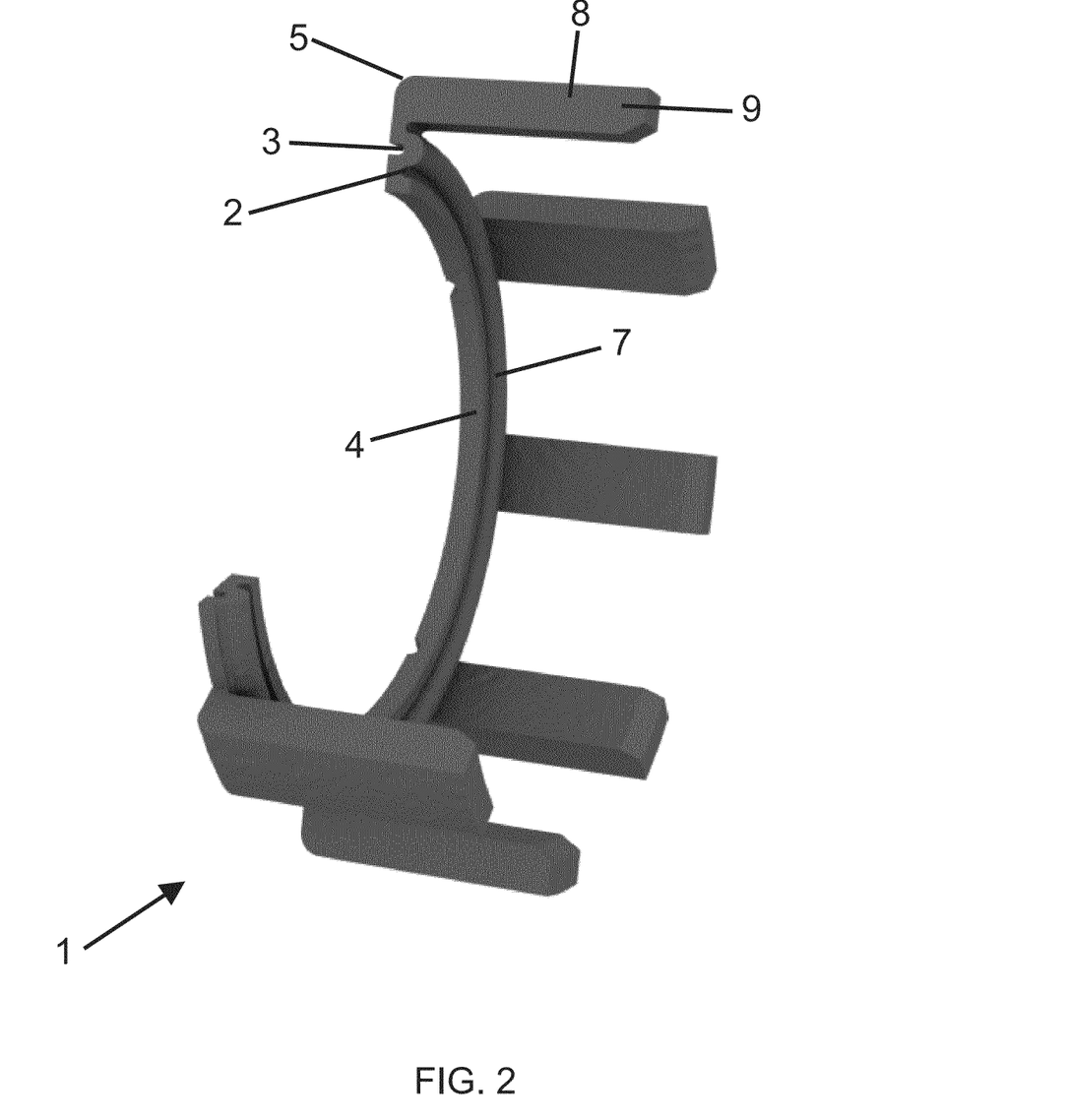
FIG. 2 illustrates a cross section of the segmented viscoelastic bushing.
Figure 3:
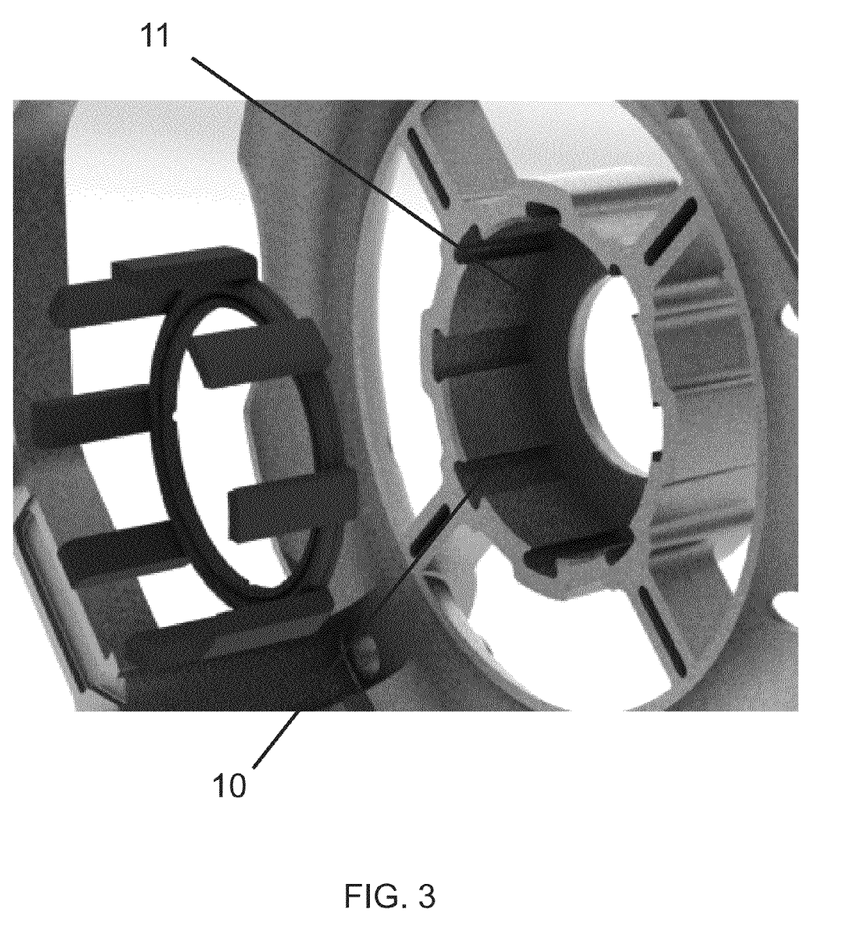
FIG. 3 illustrates a perspective view of the viscoelastic bushing and the roller bearing hub.

According to FIGS. 1 to 3, the present invention discloses a bushing which body (1), in annular shape, delimiting an inner groove (2) and an outer groove (3), designed with the purpose of absorbing the axial expansion variations during electrical machine operation. The outer groove (3) defines an inner ring (4), aiming join the segments (8) such that to facilitate its manipulation, making the bushing a single component.

The ring (4) contains in its perimeter one or more cuttings (6), in chute shape or other format, designed with the function of eliminating possible air accumulations during the assembly in the cavity bottom (11), having concavities and arranged to link the groove (3) to the inner ring (4). The outer ring (7) provides segments (8) designed equidistant to each other and linked externally about the perimeter of the outer ring (7). Each projection (8) has a lower end (5) linked to the outer ring (7) and a beveled upper end (9), forming a rectangular trapezoid.

With respect to FIGS. 1 and 2, in a preferred embodiment, the outer groove (3) delimits an inner ring (4), comprising in its perimeter cuttings (6) in bas-relief, in chute shape, arranged to link the groove (3) to the inner ring (4). In this construction, the outer ring (7) presents about eight segments (8) linked externally to the perimeter of (7). Each projection (8) has a curved end (5), and a beveled end (9).

Figure 4:
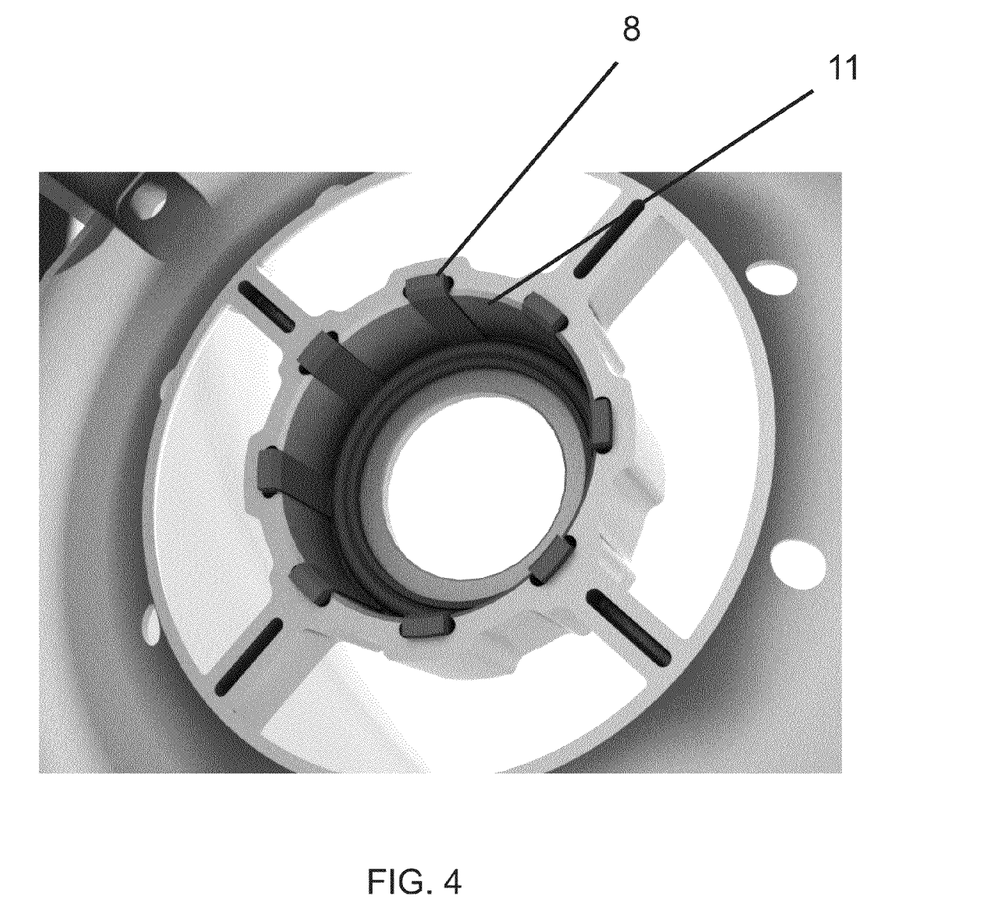
FIG. 4 illustrates a perspective view of the viscoelastic bushing housed in the hub cavity.
Figure 5:
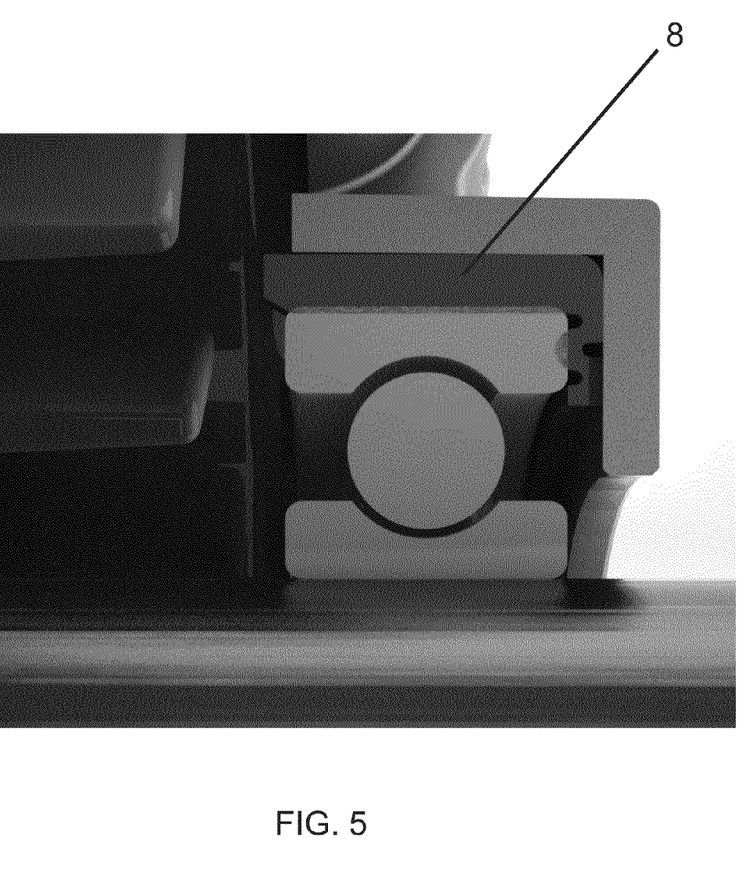
FIG. 5 illustrates an exploded cross section of the segmented viscoelastic bushing housed in the hub cavity.

According to FIGS. 3 through 5, the bushing (1) is fitted between the bearing and the wheel hub, to limit the axial and radial movement of the bearing (not shown) resulting from the existing clearance between the bearing and the bearing outer ring, limited to 20% of the air gap. The segments (8) of the viscoelastic bushing accommodate rectangular cuttings, or concave shaped cuts (10) with identical format to the projections (8) and equidistant to each other, between the cavity (11) of the hub and the bearing.

The shaft-bearing assembly can also offset axially in this configuration towards the hub wall. The inner ring (4) will replace the spring type undulating washer in spring steel, commonly used in conventional motors, compensating for possible errors in the axial assembly, expansions and giving an axial pressure value needed for the bearing proper operation of the bearing assembly.

Figure 6:
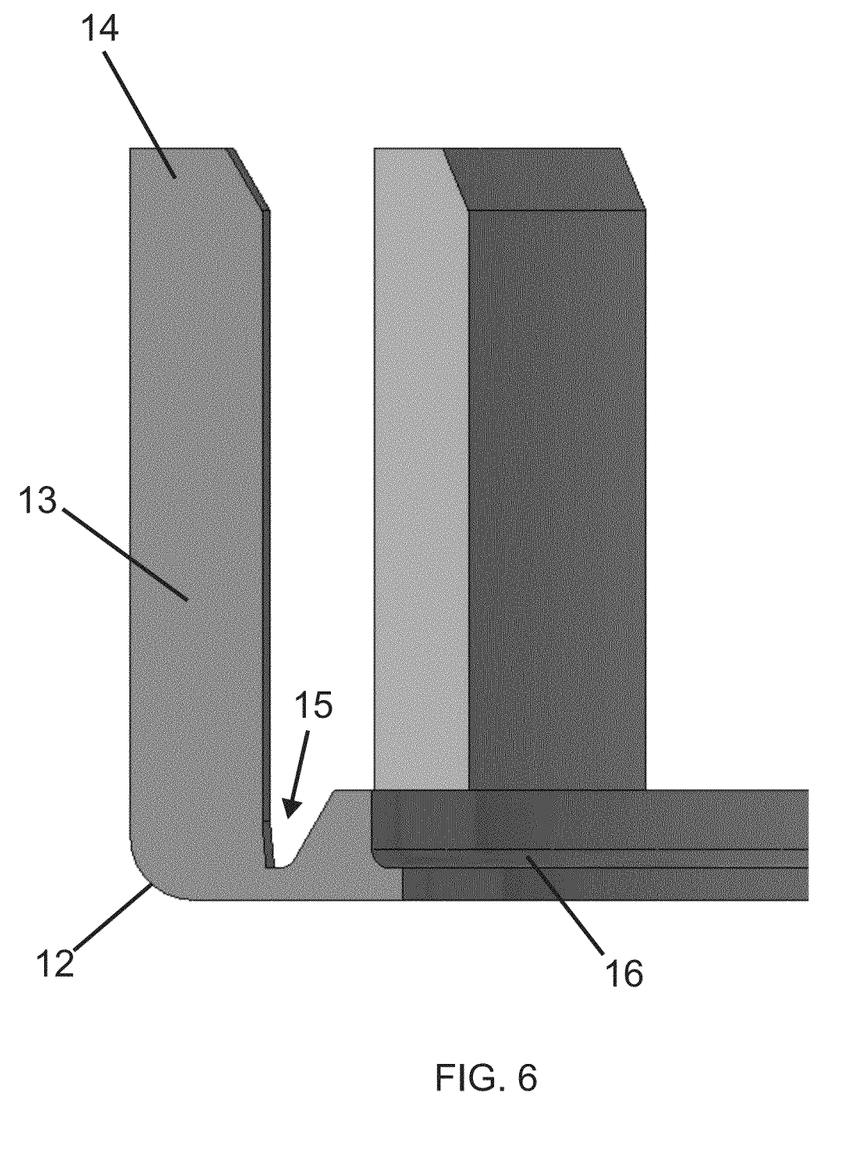
FIG. 6 illustrates a transverse cross section of a bushing embodiment.

According to FIG. 6, in another embodiment, the segments (13) are joined to a cross-section ring (16) in a T shape, joined through rectangular trapezoids grooved recesses (15). Each segment (13) having a beveled upper end (14), and the lower end (12) with rounded corners.

Figure 7A:
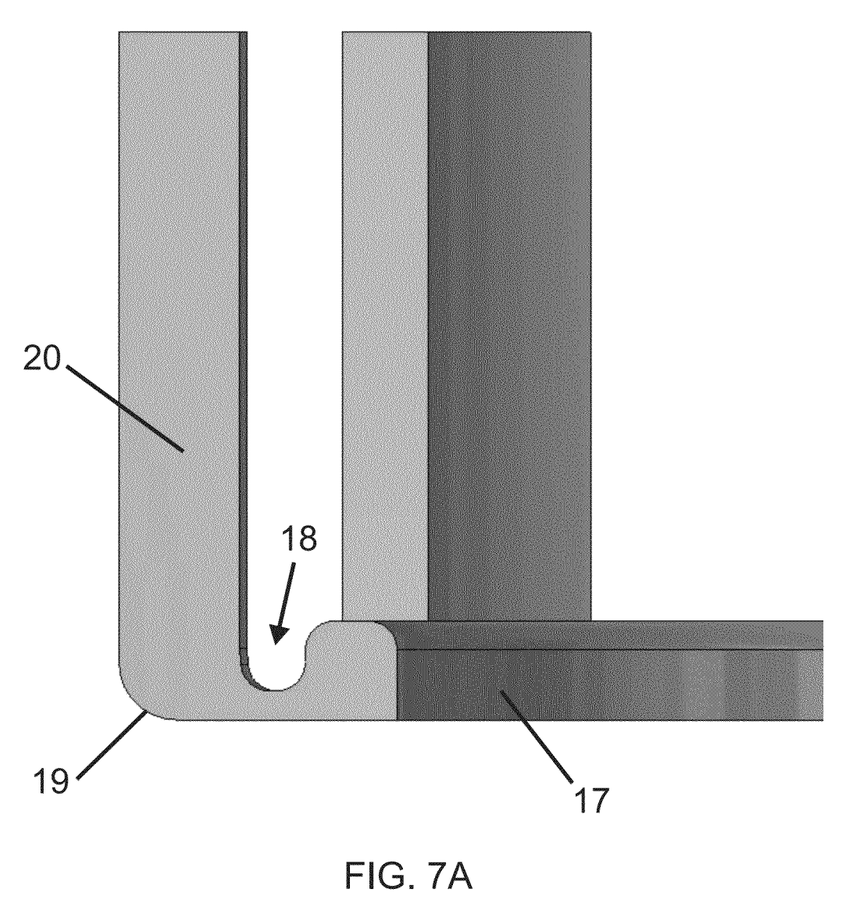
FIG. 7a illustrates a transverse cross section of another bushing embodiment.
Figure 7B:
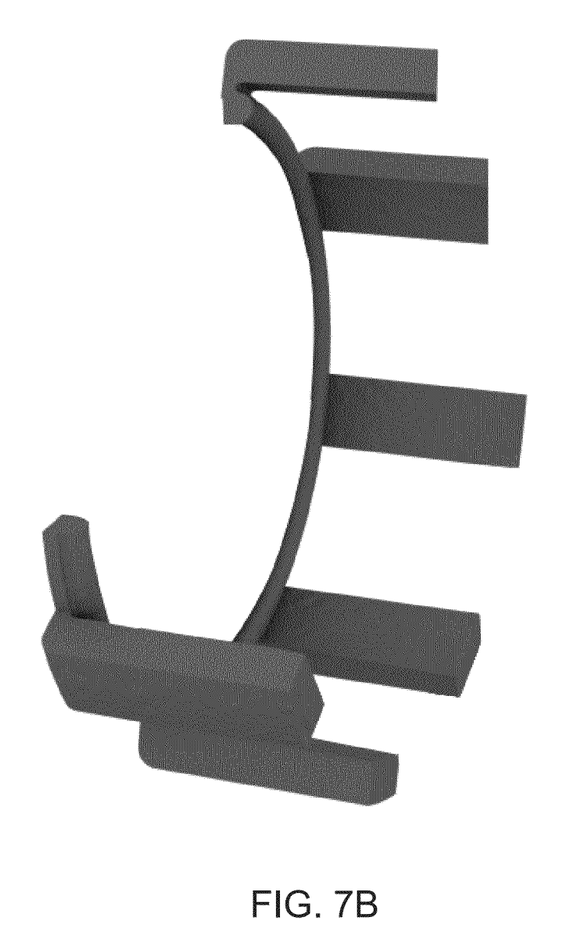
FIG. 7b illustrates a perspective view of another bushing embodiment.

In another embodiment, according to FIGS. 7a and 7b, the segments (20) have lower ends (19) curved and linked to the cross section ring perimeter (17), through the circular recessed grooves (18).

It is noted that other modifications and variations made to this invention are considered within the scope of this invention.

The invention claimed is:

1. A segmented viscoelastic bushing for rotating electrical machines bearing, to be used with a purpose of absorbing radial and axial expansion variations plus mistakes generated by high-pressure casting processes, during electrical machine operation, comprising a body in annular shape, delimiting an outer ring, presenting at least three segments linked to the outer perimeter of the outer ring, wherein the outer ring comprises an inner groove, an outer groove and an inner ring delimited by an inner groove and outer groove, in order to link the inner groove and the outer groove to the ring; said inner ring presenting cuttings in its perimeter.

2. The segmented viscoelastic bushing for rotating electrical machines bearing according to claim 1, wherein each segment comprises a lower end linked to the outer ring and an upper end in a trapezoidal rectangular shape or a rounding radius.

3. The segmented viscoelastic bushing for rotating electrical machines bearing according to claim 2, wherein the segments of the viscoelastic bushing are configured to be housed in concave-shaped cuts and equidistant to each other, between a cavity of a hub and the bearing.

4. The segmented viscoelastic bushing for rotating electrical machines bearing according to claim 1, wherein segments with curved lower ends are linked to a ring perimeter of a rectangular cross-section, through circular recessed grooves.

5. The segmented viscoelastic bushing for rotating electrical machines bearing according to claim 4, wherein the segments of the viscoelastic bushing are configured to be housed in concave-shaped cuts and equidistant to each other, between a cavity of a hub and the bearing.

6. The segmented viscoelastic bushing for rotating electrical machines bearing according to claim 1, wherein the segments of the viscoelastic bushing are configured to be housed in concave-shaped cuts and equidistant to each other, between a cavity of a hub and the bearing.

7. The segmented viscoelastic bushing for rotating electrical machines bearing according to claim 1, wherein each segment comprises a lower end linked to the outer ring and an upper end in a trapezoidal rectangular shape or a rounding radius.

8. The segmented viscoelastic bushing for rotating electrical machines bearing according to claim 1, wherein the segments of the viscoelastic bushing are configured to be housed in concave-shaped cuts and equidistant to each other, between a cavity of a hub and the bearing.

9. A segmented viscoelastic bushing for rotating electrical machines bearing, to be used with a purpose of absorbing radial and axial expansion variations plus mistakes generated by high-pressure casting processes, during electrical machine operation, comprising a body in annular shape, delimiting an outer ring, presenting at least three segments linked to the outer perimeter of the outer ring, and further comprising segments joined to a cross-section ring in a T shape through rectangular trapezoids grooved recesses; wherein each segment presents a beveled upper end and a lower end with rounded corners.

10. The segmented viscoelastic bushing for rotating electrical machines bearing according to claim 9, wherein the segments of the viscoelastic bushing are configured to be housed in concave-shaped cuts and equidistant to each other, between a cavity of a hub and the bearing.

11. The segmented viscoelastic bushing for rotating electrical machines bearing according to claim 9, wherein each segment comprises a lower end linked to the outer ring and an upper end in a trapezoidal rectangular shape or a rounding radius.

12. The segmented viscoelastic bushing for rotating electrical machines bearing according to claim 11, wherein the segments of the viscoelastic bushing are configured to be housed in concave-shaped cuts and equidistant to each other, between a cavity the hub and the bearing.

13. The segmented viscoelastic bushing for rotating electrical machines bearing according to claim 9, wherein segments with curved lower ends are linked to a ring perimeter of a rectangular cross-section, through circular recessed grooves.

14. The segmented viscoelastic bushing for rotating electrical machines bearing according to claim 13, wherein the segments of the viscoelastic bushing are configured to be housed in concave-shaped cuts and equidistant to each other, between a cavity of a hub and the bearing.

15. The segmented viscoelastic bushing for rotating electrical machines bearing according to claim 9, wherein the segments of the viscoelastic bushing are configured to be housed in concave-shaped cuts and equidistant to each other, between a cavity of a hub and the bearing.

* * * * *